(12) United States Patent
Lopitaux et al.

(10) Patent No.: US 9,080,041 B2
(45) Date of Patent: Jul. 14, 2015

(54) RUBBER COMPOSITION INCLUDING A POLAR THERMOPLASTIC ELASTOMER INCLUDING AN ALKYLACRYLATE UNIT

(75) Inventors: Garance Lopitaux, Valignat (FR); Didier Vasseur, Clermont-Ferrand (FR); Franck Varagniat, Ceyrat (FR)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 319 days.

(21) Appl. No.: 13/520,401

(22) PCT Filed: Jan. 13, 2011

(86) PCT No.: PCT/EP2011/050381
§ 371 (c)(1),
(2), (4) Date: Sep. 7, 2012

(87) PCT Pub. No.: WO2011/086119
PCT Pub. Date: Jul. 21, 2011

(65) Prior Publication Data
US 2013/0005894 A1     Jan. 3, 2013

(30) Foreign Application Priority Data
Jan. 14, 2010   (FR) ..................................... 10 50237

(51) Int. Cl.
| C08L 53/00 | (2006.01) |
| C08L 7/00 | (2006.01) |
| B60C 1/00 | (2006.01) |
| C08L 9/06 | (2006.01) |
| C08L 21/00 | (2006.01) |
| C08F 212/08 | (2006.01) |
| C08L 53/02 | (2006.01) |

(52) U.S. Cl.
CPC ................. C08L 7/00 (2013.01); B60C 1/0016 (2013.01); C08L 9/06 (2013.01); C08L 21/00 (2013.01); *C08F 212/08* (2013.01); *C08L 53/02* (2013.01)

(58) Field of Classification Search
CPC ........... C08L 53/02; C08L 53/00; C08L 9/06; C08L 9/00; C08L 7/00
USPC ........................... 524/502, 505, 515, 523, 528
See application file for complete search history.

(56) References Cited

U.S. PATENT DOCUMENTS

| 5,204,407 | A | * | 4/1993 | Araki et al. ...................... 525/99 |
| 5,391,611 | A | * | 2/1995 | Funayama et al. ............. 524/508 |
| 6,774,255 | B1 | | 8/2004 | Tardivat et al. ................ 556/427 |
| 7,199,175 | B2 | | 4/2007 | Vasseur .......................... 524/492 |
| 7,300,970 | B2 | | 11/2007 | Durel et al. .................... 524/493 |
| 7,335,692 | B2 | | 2/2008 | Vasseur et al. ................. 524/312 |
| 7,488,768 | B2 | | 2/2009 | Tardivat et al. ............... 524/262 |
| 7,491,767 | B2 | | 2/2009 | Durel et al. .................... 524/493 |
| 7,820,771 | B2 | | 10/2010 | Lapra et al. .................... 525/479 |
| 7,825,183 | B2 | | 11/2010 | Robert et al. .................. 524/476 |
| 7,834,074 | B2 | | 11/2010 | Brunelet et al. ............... 524/318 |
| 2004/0063854 | A1 | | 4/2004 | Lin et al. ........................ 524/606 |
| 2007/0208135 | A1 | | 9/2007 | Gervat et al. .................... 525/88 |
| 2009/0186961 | A1 | | 7/2009 | Da Silva et al. .............. 523/150 |
| 2009/0209709 | A1 | | 8/2009 | Da Silva et al. ........... 525/333.1 |
| 2009/0234066 | A1 | | 9/2009 | Da Silva et al. .............. 524/571 |
| 2009/0270558 | A1 | | 10/2009 | Gandon-Pain et al. ........ 525/190 |
| 2009/0292063 | A1 | | 11/2009 | Robert et al. .................. 524/518 |
| 2009/0306246 | A1 | | 12/2009 | Gervat et al. .................. 523/201 |
| 2010/0022714 | A1 | | 1/2010 | Varagniat et al. ............. 525/209 |
| 2010/0252156 | A1 | | 10/2010 | Robert et al. ............... 152/209.1 |
| 2011/0021702 | A1 | | 1/2011 | Gandon-Pain et al. ......... 525/55 |
| 2011/0178233 | A1 | * | 7/2011 | Chaboche et al. ............ 524/571 |

FOREIGN PATENT DOCUMENTS

| EP | 1 801 158 A1 | 6/2007 |
| FR | 2 918 065 A1 | 1/2009 |
| WO | WO 96/37547 A2 | 11/1996 |
| WO | WO 02/10269 A2 | 2/2002 |
| WO | WO 02/30939 A1 | 4/2002 |
| WO | WO 02/31041 A1 | 4/2002 |
| WO | WO 03/002648 A1 | 1/2003 |
| WO | WO 03/002649 A1 | 1/2003 |
| WO | WO 2006/061064 A1 | 6/2005 |
| WO | WO 2005/082996 A1 | 9/2005 |
| WO | WO 2005/087859 A1 | 9/2005 |
| WO | WO 2006/069792 A1 | 7/2006 |
| WO | WO 2006/069793 A1 | 7/2006 |
| WO | WO 2006/125532 A1 | 11/2006 |
| WO | WO 2006/125533 A1 | 11/2006 |
| WO | WO 2006/125534 A1 | 11/2006 |
| WO | WO 2007/017060 A1 | 2/2007 |
| WO | WO 2008/003434 A1 | 1/2008 |
| WO | WO 2008/003435 A1 | 1/2008 |

* cited by examiner

*Primary Examiner* — Wenwen Cai
(74) *Attorney, Agent, or Firm* — Fitzpatrick, Cella, Harper & Scinto

(57) ABSTRACT

A rubber composition used for forming a tread of a tire includes an elastomer matrix, a reinforcing filler, and a coupling agent. The elastomer matrix includes from 60 to 95 phr of at least one diene elastomer and from 5 to 40 phr of a polar thermoplastic elastomer (TPE). The polar TPE includes at least one elastomer block and one polar thermoplastic block selected from a homopolymer or copolymers of an alkylacrylic acid ester, with an alkyl radical containing 1 to 4 carbon atoms. The reinforcing filler includes a reinforcing inorganic filler. The presence of the polar TPE makes it possible to improve a compromise of wet grip and dry grip performances of the tread.

14 Claims, No Drawings

RUBBER COMPOSITION INCLUDING A POLAR THERMOPLASTIC ELASTOMER INCLUDING AN ALKYLACRYLATE UNIT

FIELD OF THE INVENTION

The present invention relates to tyre treads comprising rubber compositions reinforced with an inorganic filler.

BACKGROUND

As is known, a tyre tread has to meet a large number of often conflicting technical requirements, including a low rolling resistance, a high wear resistance and a high grip on both the dry road and the wet road.

These compromises in properties, in particular from the viewpoint of the rolling resistance and the wear resistance, were able to be improved in recent years with regard to energy-saving "Green Tyres", intended in particular for passenger vehicles, by virtue of the use of novel weakly hysteretic rubber compositions having the characteristic of being reinforced predominantly by specific inorganic fillers described as reinforcing, in particular by highly dispersible silicas (HDSs), capable of rivalling, from the viewpoint of the reinforcing power, conventional tyre-grade carbon blacks.

Thus, today, these reinforcing inorganic fillers are gradually replacing carbon blacks in tyre treads, all the more so as they have another known virtue, that of increasing the grip of tyres on wet, snowy or icy roads.

It is known in particular to use thermoplastic elastomers (TPEs) in rubber compositions intended in particular for tyre tread applications. The use of such elastomers makes it possible in particular to improve certain usage properties of the tyre, in particular the grip, rolling resistance and abrasion resistance performances.

BRIEF DESCRIPTION OF THE INVENTION

The objective of the present invention is to provide a tyre compound that makes it possible to retain the gain in grip conferred by the use of inorganic filler, while improving the grip on dry ground, since the improvement in the grip properties of tyres remains a constant concern of tyre designers.

The objective of the present invention is achieved in that the inventors have found a specific rubber composition, based on an elastomer matrix comprising at least one diene elastomer and a polar TPE copolymer, and on a reinforcing filler comprising a reinforcing inorganic filler, which makes it possible to obtain tyre treads having a significantly improved compromise of the properties of grip on wet ground and on dry ground. Furthermore, the inventors have demonstrated that the use of polar thermoplastic elastomers in such a rubber composition also makes it possible to respond to the problem linked to the improvement in the compromise of properties in the uncrosslinked/crosslinked states of said composition.

Thus, a first subject of the invention is a rubber composition for a tyre tread based on:
(a) an elastomer matrix comprising:
   from 60 to 95 phr of at least one diene elastomer and
   from 5 to 40 phr of a polar TPE copolymer, and
(b) a reinforcing filler comprising a reinforcing inorganic filler,
(c) a coupling agent.

Another subject of the invention is the use of this rubber composition for the manufacture of tyres or of semi-finished products for tyres, in particular of tyre treads, whether the latter are intended for the manufacture of new tyres or for the retreading of worn tyres.

Another subject of the invention is a tread comprising a rubber composition according to the invention.

Another subject of the invention is the tyres themselves, when they comprise a rubber composition in accordance with the invention.

The expression composition "based on" should be understood to mean a composition comprising the mixture and/or the reaction product of the various constituents used, some of these base constituents being capable of reacting, or intended to react, with one another, at least in part, during the various phases of manufacture of the composition, in particular during the crosslinking or vulcanization thereof.

In the present description, unless expressly indicated otherwise, all the percentages (%) shown are % by weight. Furthermore, any range of values denoted by the expression "between a and b" represents the field of values ranging from more than a to less than b (that is to say limits a and b excluded) whereas any range of values denoted by the expression "from a to b" means the field of values ranging from a up to b (that is to say including the strict limits a and b). "phr" means parts by weight per hundred parts of total elastomer, therefore including the polar TPE copolymer.

Thus, a first subject of the invention is a rubber composition based on:
(a) an elastomer matrix comprising:
   from 60 to 95 phr of at least one diene elastomer and
   from 5 to 40 phr of a polar TPE copolymer, and
(b) a reinforcing filler comprising a reinforcing inorganic filler,
(c) a coupling agent.

The elastomer matrix comprises at least one diene elastomer in proportions ranging from 60 phr to 95 phr. Below the indicated minimum, the grip on dry ground performance has a tendency to decrease substantially, whereas above the recommended maximum the grip on wet ground performance is degraded. Preferably, the elastomer matrix comprises between 70 and 90 phr of at least one diene elastomer.

It is recalled here that the "elastomer" of "diene" type should be understood to mean, in a known manner, an elastomer resulting at least in part (i.e., a homopolymer or a copolymer) from diene monomers (monomers bearing two carbon-carbon double bonds which may or may not be conjugated).

The expression "diene elastomer" should be understood, according to the invention, to mean any synthetic elastomer resulting at least in part from diene monomers. More particularly, the expression "diene elastomer" is understood to mean any homopolymer obtained by polymerization of a conjugated diene monomer having 4 to 12 carbon atoms, or any copolymer obtained by copolymerization of one or more conjugated dienes with one another or with one or more vinylaromatic compounds having from 8 to 20 carbon atoms. In the case of copolymers, these contain from 20% to 99% by weight of diene units, and from 1% to 80% by weight of vinylaromatic units.

Suitable conjugated dienes that can be used in the process in accordance with the invention are, in particular, 1,3-butadiene, 2-methyl-1,3-butadiene, 2,3-di($C_1$-$C_5$)alkyl-1,3-butadienes, such as, for example, 2,3-dimethyl-1,3-butadiene, 2,3-diethyl-1,3-butadiene, 2-methyl-3-ethyl-1,3-butadiene or 2-methyl-3-isopropyl-1,3-butadiene, phenyl-1,3-butadiene, 1,3-pentadiene, 2,4-hexadiene, etc.

Suitable vinylaromatic compounds are, in particular, styrene, ortho-, meta- and para-methylstyrene, the commercial "vinyl-toluene" mixture, para-(tert-butyl)styrene, methoxystyrenes, vinylmesitylene, divinylbenzene, vinylnaphthalene, etc.

The following are suitable: polybutadienes, and in particular those having a content (mol %) of 1,2-units of between 4% and 80% or those having a content (mol %) of cis-1,4-units of greater than 80%, polyisoprenes, butadiene/styrene copolymers and in particular those having a $T_g$ (glass transition temperature, measured according to ASTM D3418) of between 0° C. and −70° C. and more particularly between −10° C. and −60° C., a styrene content of between 5% and 60% by weight and more particularly between 20% and 50%, a content (mol %) of 1,2-bonds of the butadiene part of between 4% and 75% and a content (mol %) of trans-1,4-bonds of between 10% and 80%, butadiene/isoprene copolymers and in particular those having an isoprene content of between 5% and 90% by weight and a $T_g$ from −40° C. to −80° C., or isoprene/styrene copolymers and in particular those having a styrene content of between 5% and 50% by weight and a $T_g$ of between −5° C. and −55° C. Especially suitable in the case of butadiene/styrene/isoprene copolymers are those having a styrene content of between 5% and 50% by weight and more particularly between 10% and 40%, an isoprene content of between 15% and 60% by weight and more particularly between 20% and 50%, a butadiene content of between 5% and 50% by weight and more particularly between 20% and 40%, a content (mol %) of 1,2-units of the butadiene part of between 4% and 85%, a content (mol %) of trans-1,4-units of the butadiene part of between 6% and 80%, a content (mol %) of 1,2-plus 3,4-units of the isoprene part of between 5% and 70% and a content (mol %) of trans-1,4-units of the isoprene part of between 10% and 50%, and more generally any butadiene/styrene/isoprene copolymer having a $T_g$ of between −20° C. and −70° C.

To sum up, the diene elastomer of the composition in accordance with the invention is preferably selected from the group of diene elastomers consisting of polybutadienes, synthetic polyisoprenes, natural rubber, butadiene copolymers, isoprene copolymers and mixtures of these elastomers. Such copolymers are more preferably selected from the group consisting of styrene copolymers (SBR, SIR and SBIR), polybutadienes (BR) and natural rubber (NR).

According to one particular implementation of the invention, the elastomer matrix comprises a diene elastomer selected from those described previously.

According to another particular implementation of the invention, the elastomer matrix comprises at least two diene elastomers. According to a first variant of this implementation, one of the two elastomers is preferably a styrene copolymer, for example an SBR, an SBIR, an SIR or mixtures thereof, in proportions of between 60% and 100% by weight of the total weight of diene elastomer, the other one being selected from polybutadienes and natural rubber in proportions of between 0% and 40% by weight of the total weight of diene elastomer. According to a second variant of this implementation, one of the two elastomers is preferably natural rubber in proportions of between 70% and 100% by weight of the total weight of diene elastomer, the other elastomer preferably being a styrene copolymer, for example an SBR, an SBIR, an SIR or mixtures thereof, in proportions of between 0% and 30% by weight of the total weight of diene elastomer.

The elastomer matrix comprises, as second component, a polar thermoplastic elastomer TPE in proportions ranging from 5 phr to 40 phr. Below the indicated minimum, the grip on wet ground performance has a tendency to decrease substantially, whereas above the recommended maximum the grip on dry ground performance is degraded. Preferably, the elastomer matrix comprises from 5 phr to 30 phr, more preferably from 10 phr to 25 phr of a polar thermoplastic elastomer TPE.

The polar thermoplastic elastomer TPE according to the present invention is a copolymer comprising an elastomer block (denoted by B for simplification reasons) and at least one thermoplastic block, this one being polar (denoted by M for simplification reasons). It is essentially in the form of a diblock copolymer or a triblock copolymer. The polar thermoplastic elastomer TPE according to the present invention may also consist of a mixture of these copolymers.

The elastomer block B is advantageously a diene elastomer as defined previously. It is preferably a polybutadiene or a styrene copolymer such as an SBR for example. The elastomer block B preferably has a weight-average molecular weight ($M_w$) of from 5000 to 65 000 g/mol.

The polar thermoplastic block M may be either a homopolymer obtained by polymerization of at least one monomer selected from short-chain alkylacrylic acid esters (having 1 to 4 carbon atoms), the radical alkyl preferably comprising 1 to 4 carbon atoms, or a copolymer obtained by copolymerization of one or more of these monomers with one another or with one or more acrylic or non-acrylic monomers. If the polar thermoplastic block M is a copolymer, the latter preferably contains at least 70% by weight of an alkyl acrylate unit. Advantageously, the alkylacrylic acid ester monomer is a short-chain methacrylic acid ester, more preferably still selected from methyl methacrylate and ethyl methacrylate. Thus, according to one preferential aspect of the invention, the polar thermoplastic block M is a polymer of polymethyl methacrylate (PMMA) or polyethyl methacrylate (PEMA) type.

The polar thermoplastic block M preferably has a weight-average molecular weight ($M_w$) of from 35 000 to 70 000 g/mol.

According to one variant of the invention, the polar thermoplastic elastomer TPE may comprise a third block, which is a thermoplastic block (denoted by S for simplification reasons), different from the polar thermoplastic block M. Advantageously, this thermoplastic block is either a homopolymer obtained by polymerization of at least one vinylaromatic monomer, or a copolymer obtained by copolymerization of one or more of these vinylaromatic monomers with one another or with one or more other monomers.

Suitable vinylaromatic monomers are, in particular, styrene, ortho-, meta- and para-methylstyrene, the commercial "vinyl-toluene" mixture, para-(tert-butyl)styrene, methoxystyrenes, vinylmesitylene, divinylbenzene, vinylnaphthalene, etc. Preferably the monomer is the styrene.

Thus, according to one preferential aspect of the invention, the thermoplastic block S is a polystyrene.

The thermoplastic block S preferably has a weight-average molecular weight ($M_w$) of from 14 000 to 55 000 g/mol.

According to the invention, the polar thermoplastic elastomer TPE preferably has a weight-average molecular weight ($M_w$) of from 40 000 to 190 000 g/mol.

According to the invention, the polar thermoplastic elastomer TPE advantageously has the following composition, expressed as weight fractions:
  the elastomer block B represents from 20% to 60%, preferably between 30% and 50%,
  the polar thermoplastic block M represents from 21% to 42%, preferably between 30% and 42%, out of 100% of polar thermoplastic elastomer TPE.

According to the variant of the invention where the polar thermoplastic elastomer is a triblock, the thermoplastic block S represents from 13% to 52%, preferably between 13% and 20%, out of 100% of polar thermoplastic elastomer TPE.

According to one preferred implementation of this variant, the polar thermoplastic elastomer TPE is a polystyrene/polybutadiene/polyethyl methacrylate copolymer or a polystyrene/polybutadiene/polymethyl methacrylate copolymer, the latter being particularly preferred.

Such products are commercially available. Mention may be made, for example, of the product sold under the name Nanostrength® by the company Arkema with various grades referenced A012 or GV100.

The elastomer matrix may also comprise, in combination with the components described previously, another thermoplastic elastomer.

The rubber composition, which is the subject of the invention, comprises, as second essential component, a reinforcing filler comprising an inorganic filler. Advantageously, the inorganic filler is the predominant filler of the reinforcing filler and preferably represents a weight fraction greater than or equal to 50% of this reinforcing filler, and particularly a weight fraction between 50% and 100%, or even up to 100%.

The expression "reinforcing inorganic filler" should be understood in the present patent application, by definition, as meaning any inorganic or mineral filler, whatever its colour or its origin (natural or synthetic), also known as "white filler", "clear filler", indeed even "non-black filler", in contrast to carbon black, capable of reinforcing by itself alone, without means other than an intermediate coupling agent, a rubber composition intended for the manufacture of tyres, in other words capable of replacing, in its reinforcing role, a conventional tyre-grade carbon black; such a filler is generally characterized, in a known way, by the presence of hydroxyl (—OH) groups at its surface.

Preferably, the reinforcing inorganic filler is, in its entirety or at the very least predominantly, silica ($SiO_2$). The silica used may be any reinforcing silica known to a person skilled in the art, in particular any precipitated or pyrogenic silica having a BET surface area and also a CTAB specific surface area both of less than 450 $m^2/g$, even if highly dispersible precipitated silicas are preferred. Mention will also be made, as reinforcing inorganic filler, of mineral fillers of the aluminous type, in particular alumina ($Al_2O_3$) or aluminium (oxide) hydroxides, or else of reinforcing titanium oxides.

The physical state in which the reinforcing inorganic filler is provided is not important, whether it is in the form of a powder, of microbeads, of granules, or else of balls. Of course, the expression "reinforcing inorganic filler" is also understood to mean mixtures of various reinforcing inorganic fillers, in particular of highly dispersible silicas as described above.

It will be noted that the reinforcing filler may contain, as a blend (mixture), in addition to the aforementioned reinforcing inorganic filler(s), an organic filler, such as carbon black. This reinforcing organic filler is then preferably present in a weight fraction of less than 50% relative to the total weight of the filler.

Suitable carbon blacks are all carbon blacks conventionally used in rubber compositions for tyres (blacks known as tyre-grade blacks). The carbon blacks could, for example, already be incorporated into the natural rubber in the form of a masterbatch.

For example, the black/silica blends or the blacks partially or fully covered with silica are suitable for forming the reinforcing filler. Carbon blacks modified by silica, such as, without implied limitation, the fillers which are sold by Cabot under the name "CRX 2000", and which are described in the international patent document WO A 96/37547, are also suitable. Mention may be made, as examples of organic fillers other than carbon blacks, of functionalized polyvinylaromatic organic fillers, as described in applications WO-A-2006/069792 and WO-A-2006/069793, or else of functionalized non-aromatic polyvinyl organic fillers, as described in applications WO-A-2008/003434 and WO-A-2008/003435.

In the case where the reinforcing filler contains only a reinforcing inorganic filler and carbon black, the weight fraction of this carbon black in said reinforcing filler is more preferably chosen to be less than or equal to 30%, relative to the total weight of the reinforcing filler.

The rubber composition according to the invention comprises, as another component, a coupling agent for coupling the reinforcing inorganic filler to the elastomers that make up the elastomer matrix.

The expression "coupling agent" is understood more precisely to mean an agent capable of establishing a sufficient bond of chemical and/or physical nature between the filler in question and the elastomer, while facilitating the dispersion of this filler within the elastomer matrix.

Use may be made of any coupling agent known for, or capable of effectively ensuring, in the rubber compositions that can be used for the manufacture of tyres, the coupling between a reinforcing inorganic filler such as silica and a diene elastomer, such as, for example, organosilanes, in particular alkoxysilane polysulphides or mercaptosilanes, or else polyorganosiloxanes bearing functions capable of bonding physically and/or chemically to the inorganic filler and functions capable of bonding physically and/or chemically to the elastomer, for example by means of a sulphur atom. Silica/elastomer coupling agents, in particular, have been described in a large number of documents, the best known being bifunctional alkoxysilanes, such as alkoxysilane polysulphides. Use is made in particular of silane polysulphides, referred to as "symmetrical" or "asymmetrical" depending on their specific structure, as described, for example, in applications WO 03/002648 (or US 2005/016651) and WO 03/002649 (or US 2005/016650).

Mention will in particular be made, as coupling agent other than alkoxysilane polysulphide, of bifunctional POSs (polyorganosiloxanes) or else of hydroxysilane polysulphides, such as described in patent applications WO 02/30939 (or U.S. Pat. No. 6,774,255) and WO 02/31041 (or US 2004/051210), or else of silanes or POSs bearing azodicarbonyl functional groups, such as described, for example, in patent applications WO 2006/125532, WO 2006/125533 and WO 2006/125534.

In the compositions in accordance with the invention, the content of coupling agent is advantageously less than 20 phr, it being understood that it is generally desirable to use the least amount possible thereof. Its content is preferably between 0.5 and 12 phr, more preferably from 3 to 10 phr, in particular from 4 to 7 phr. This content is easily adjusted by a person skilled in the art according to the content of inorganic filler used in the composition.

A person skilled in the art will understand that a reinforcing filler of another nature, in particular organic nature, might be used as filler equivalent to the reinforcing inorganic filler described in the present section, provided that this reinforcing filler is covered with an inorganic layer, such as silica, or else comprises, at its surface, functional sites, in particular hydroxyl sites, requiring the use of a coupling agent in order to form the bond between the filler and the elastomer.

The rubber compositions in accordance with the invention may also contain, in addition to coupling agents, coupling activators, agents for covering the inorganic fillers or more generally processing aids capable, in a known manner, by virtue of an improvement in the dispersion of the filler in the rubber matrix and of a reduction in the viscosity of the compositions, of improving their ease of processing in the uncured state, these agents or aids being, for example, hydrolysable silanes such as alkylalkoxysilanes, polyols, polyethers, primary, secondary or tertiary amines, or hydroxylated or hydrolysable polyorganosiloxanes.

The rubber compositions in accordance with the invention may also comprise all or some of the usual additives customarily used in elastomer compositions intended for the manufacture of tyres, such as, for example, pigments, protection agents, such as antiozone waxes, chemical antiozonants, antioxidants, antifatigue agents, reinforcing or plasticizing resins, methylene acceptors (for example, phenol-novolac resin) or methylene donors (for example, HMT or H3M) as described, for example, in application WO 02/10269, a crosslinking system based either on sulphur or on sulphur donors and/or on peroxide and/or on bismaleimides, vulcanization accelerators, vulcanization activators, adhesion promoters such as cobalt-based compounds, plasticizing agents, preferably non-aromatic or very weakly aromatic plasticizing agents selected from the group consisting of naphthenic oils, paraffinic oils, MES oils, TDAE oils, ether plasticizers, ester plasticizers (for example glycerol trioleates), hydrocarbon-based resins having a high $T_g$, preferably above 30° C., as described for example in applications WO 2005/087859, WO 2006/061064 and WO 2007/017060, and mixtures of such compounds.

The invention also relates to a process for preparing a rubber composition as described previously.

The composition is manufactured in appropriate mixers using two successive preparation phases well known to a person skilled in the art: a first phase of thermomechanical working or kneading (referred to as "non-productive" phase) at high temperature, up to a maximum temperature of between 110° C. and 190° C., preferably between 130° C. and 180° C., followed by a second phase of mechanical working (referred to as "productive" phase) up to a lower temperature, typically of less than 110° C., for example between 40° C. and 100° C., finishing phase during which the crosslinking system is incorporated.

The process in accordance with the invention for preparing a rubber composition according to the invention comprises at least the following stages:
 carrying out, at a maximum temperature of between 130° C. and 200° C., preferably between 145° C. and 185° C., a first step of thermomechanical working (sometimes described as "non-productive" phase) of the necessary base constituents with the exception of the crosslinking system, by intimately incorporating, of the rubber composition by kneading in one or more stages into the elastomer matrix based on natural rubber, ingredients of the composition, then
 carrying out, at a temperature below said maximum temperature of said first step, preferably below 120° C., a second step of mechanical working during which said crosslinking system, and where appropriate an adhesion promoter, are incorporated.

The final composition thus obtained can then be calendered, for example in the form of a sheet or slab, or else extruded, for example to form a rubber profiled element that can be used as a semi-finished rubber product intended for a tyre.

Another subject of the invention is a tyre which incorporates, in at least one of its constituent components, a reinforced rubber composition according to the invention.

One subject of the invention is very particularly a semi-finished rubber product, comprising a reinforced rubber composition according to the invention, intended for these tyres.

Due to certain dynamic properties, highlighted in the following examples, which characterize a reinforced rubber composition according to the invention, it will be noted that a tyre having a tread that comprises the composition exhibits improved grip on wet ground and on dry ground. This improvement of the grip properties is confirmed by the results of road tests. Thus, a tread comprising a rubber composition according to the invention constitutes one particularly advantageous implementation of the invention and constitutes one subject of the invention.

DETAILED DESCRIPTION OF EMBODIMENTS OF THE INVENTION

The aforementioned features of the present invention, and others, will be better understood on reading the following description of several exemplary embodiments of the invention, given by way of illustration and without implied limitation.

Measurements and Tests Used

I—Rubber Tests

The rubber compositions are characterized, before and after curing, as indicated below.

I-1. Mooney Plasticity

Use is made of an oscillating consistometer as described in the French standard NF T 43-005 (1991). The Mooney plasticity measurement is carried out according to the following principle: the composition in the uncured state (i.e. before curing) is moulded in a cylindrical chamber heated to 100° C. After preheating for one minute, the rotor rotates within the test specimen at 2 rpm and the working torque for maintaining this movement is measured after rotating for 4 minutes. The Mooney plasticity (ML 1+4) is expressed in "Mooney units" (MU, with 1 MU=0.83 Newton.meter).

I.2—Shore A Hardness

The Shore A hardness of the compositions after curing is assessed in accordance with the standard ASTM D 2240-86.

I-3 Tensile Tests

These tests make it possible to determine the elasticity stresses and the properties at break. Unless otherwise indicated, they are carried out in accordance with the French standard NF T 46-002 of September 1988. At second elongation (i.e. after an accommodation cycle) the "nominal" secant moduli (or apparent stresses, in MPa) are measured at 100% elongation (denoted by "M100"). All these tensile measurements are carried out under standard temperature (23±2° C.) and moisture (50±5% relative humidity) conditions, according to the French standard NF T 40-101 (December 1979).

I.4—Dynamic Properties

The dynamic properties are measured on a viscosity analyser (Metravib VA4000), according to the standard ASTM D 5992-96. The response of a sample of vulcanized composition (cylindrical test specimen with a thickness of 4 mm and with a cross section of 400 mm$^2$), subjected to a sinusoidal stress in simple alternating shear, at a frequency of 10 Hz, during a temperature sweep, under a fixed stress of 0.7 MPa, is recorded. The value of tan δ observed at 0° C. (i.e. tan(δ)$_{0° C.}$) and the value of tan δ observed at 20° C. (i.e. tan(δ)$_{20° C.}$), are recorded.

It is recalled, in a manner well known to a person skilled in the art, that the value of tan(δ)$_{0° C.}$ is representative of the potential to grip on wet ground: the higher tan(δ)$_{0° C.}$, the better the grip. The value of tan(δ)$_{20° C.}$ is representative of the potential to grip on dry ground: the higher tan(δ)$_{20° C.}$, the better the grip.

II.—Tests on Tyres

II.1—Braking on Wet Ground, with an ABS System

The tyres are fitted to a motor vehicle of Renault Mégane 1.6 RTE make and model, equipped with an ABS braking system and the distance needed to go from 80 km/h to 10 km/h is measured during sudden braking on water-sprayed ground (bituminous concrete). A value greater than that of the control, arbitrarily set at 100, indicates an improved result, that is to say a shorter braking distance.

II.2—Braking on Dry Ground, with an ABS System

The tyres are fitted to a motor vehicle of Renault Mégane 1.6 RTE make and model, equipped with an ABS braking system and the distance needed to go from 100 km/h to 0 km/h is measured during sudden braking on dry ground (bituminous concrete).

II.3—Road Handling

To assess the performances of grip on wet ground, the handling of tyres fitted to a motor vehicle of Renault Mégane 1.6 RTE make and model, travelling under speed limit conditions around a very winding circuit that is sprayed in order to keep the ground wet, is analysed. The minimum time needed to travel the whole of the circuit is measured. A value greater than that of the control, arbitrarily set at 100, indicates an improved result, that is to say a shorter travel time.

III.—Results

III.1—Preparation of the Compositions

The tests which follow are carried out in the following manner: the styrene-butadiene copolymer, the polar thermoplastic elastomer TPE, ⅔ of the reinforcing filler (silica) and the coupling agent are successively introduced into a 3-liter internal mixer (final fill ratio: around 70% by volume), the initial vessel temperature of which is around 70° C. When the temperature reaches around 95° C., the remainder of the filler and also the various other ingredients, with the exception of the vulcanization system, are introduced. Thermomechanical working (non-productive phase) is then carried out in one stage, which lasts in total around 5 minutes for an average blade speed of 50 rpm, until a maximum "dropping" temperature of 165° C. is reached.

The mixture thus obtained is recovered and cooled and then sulphur and an accelerator of sulphenamide type are incorporated in a mixer (homofinisher) at 50° C., the combined mixture being mixed (productive phase) for the appropriate time (for example, between 5 and 12 min).

The compositions thus obtained are subsequently calendered, either in the form of slabs (thickness of 2 to 3 mm) or of thin sheets of rubber, for the measurement of their physical or mechanical properties, or extruded in the form of a tread.

Four rubber compositions were prepared as indicated previously, three in accordance with the invention (denoted hereinbelow by B, C and D) and one not in accordance with the invention (control A).

Their formulations (in phr) have been summarized in the table below.

| Components | A (Control) | B | C | D |
|---|---|---|---|---|
| SBR elastomer solution (1) | 110 | 99 | 88 | 77 |
| TPE (2) | | 10 | 20 | 30 |
| Silica (3) | 110 | 110 | 110 | 110 |
| Coupling agent (4) | 8.8 | 8.8 | 8.8 | 8.8 |
| Carbon black N234 | 4 | 4 | 4 | 4 |
| PLASTICIZER A (5) | 23 | 26 | 29 | 32 |
| PLASTICIZER B (6) | 23 | 26 | 29 | 32 |
| Ozone wax C32ST | 1.5 | 1.5 | 1.5 | 1.5 |
| Antioxidant (7) | 2 | 2 | 2 | 2 |
| Diphenylguanidine (8) | 2.1 | 2.1 | 2.1 | 2.1 |
| ZnO | 1.8 | 1.8 | 1.8 | 1.8 |
| Stearic acid | 2 | 2 | 2 | 2 |
| Sulphur | 1.3 | 1.3 | 1.3 | 1.3 |
| CBS (9) | 1.9 | 1.9 | 1.9 | 1.9 |

(1) SBR solution extended with 10 phr of oil;
(2) Styrene (13%)-Butadiene (45%)-Methyl methacrylate (42%) (SBM) copolymer sold under the name Nanostrength A012 by the company ARKEMA;
(3) silica sold under the name Ultrasil 7000 GR by the company Degussa;
(4) coupling agent TESPT sold under the name "Si69" by the company Degussa;
(5) Plasticizer A: oleic sunflower oil;
(6) Plasticizer B: polylimonene resin THER9872 sold under the name Dercolyte L120 by the company DRT;
(7) N-1,3-dimethylbutyl-N-phenyl-para-phenylenediamine (Santoflex 6-PPD from the company Flexsys);
(8) Diphenylguanidine ("Perkacit DPG" from the company Flexsys);
(9) N-cyclohexyl-2-benzothiazylsulphenamide (Santocure CBS from the company Flexsys).

III.2—Results

A—Rubber Tests

The results of the tests have been summarized in Table 1.

TABLE 1

| Composition | A (control) | B | C | D |
|---|---|---|---|---|
| Properties in the uncrosslinked state | | | | |
| ML1 + 4 100° C. | 78 | 57 | 44 | 34 |
| Properties in the crosslinked state | | | | |
| Shore A | 64 | 66 | 68 | 70 |
| MA100 (MPa) | 2.0 | 2.1 | 1.9 | 2.0 |
| tan(δ) at 0° C. (0.7 MPa) | 0.76 | 0.76 | 0.75 | 0.72 |
| tan(δ) at 20° C. (0.7 MPa) | 0.35 | 0.39 | 0.41 | 0.44 |

Surprisingly, the hysteresis potential at 20° C. (temperature sweep at 0.7 MPa) of the three compositions B, C and D, subjects of the invention, is higher without the hysteresis potential at 0° C. altering.

At the same time, it is observed that the three compositions B, C and D display a greatly improved compromise of properties in the uncrosslinked/crosslinked state. Indeed, the Mooney viscosity decreases whilst the hardness at small deformation (Shore hardness) and at large deformation (MA 100) remain stable.

In conclusion, substituting a fraction of the diene elastomer of the matrix with a polar thermoplastic elastomer, comprising methacrylate blocks, makes it possible to increase tan(δ) at 20° C. without adversely affecting tan(δ) at 0° C. This appears to indicate that these mixtures would make it possible to increase the grip performances of tyres having tread that consists of such mixtures.

Surprisingly, it has also been demonstrated that the use of the polar thermoplastic elastomer makes it possible to improve the compromise of properties in the uncrosslinked/crosslinked state.

B—Tests on Tyres

The compositions A and C were used to form the tread of tyres PA and PC tested under the conditions described above. The results of the tests have been summarized in Table 2.

TABLE 2

| Tyre | PA (control) | PC |
|---|---|---|
| braking on wet ground | 100 | 105 |
| braking on dry ground | 100 | 100 |
| transverse grip on wet ground | 100 | 120 |

On reading Table 2 (results in relative units), it is observed that the rolling of the tyres reveals a particularly notable improvement in the grip on wet ground of the PC tyre tread comprising the composition C according to the invention compared to the control PA, with a significant improvement in the transverse grip on wet ground of 20%, while retaining the same excellent level of grip on dry ground.

The invention claimed is:

1. A rubber composition of a tyre tread, the rubber composition comprising:
   an elastomer matrix including:
      from 60 to 95 phr of a diene elastomer, and
      from 5 to 40 phr of a polar thermoplastic elastomer that includes an elastomer block and a polar thermoplastic block selected from a homopolymer or copolymers of an alkylacrylic acid ester, wherein the alkyl radical of the alkylacrylic acid ester includes 1 to 4 carbon atoms;
   a reinforcing filler that includes a reinforcing inorganic filler; and
   a coupling agent,
   wherein the diene elastomer of the elastomer matrix includes:
      a styrene copolymer at an amount between 60% and 100% by weight of the total weight of the diene elastomer, and
      a polybutadiene, a natural rubber, or a mixture of a polybutadiene and a natural rubber at an amount between 0% and 40% by weight of the total weight of the diene elastomer.

2. A tyre comprising a tread, wherein the tread is formed of a rubber composition that includes:
   an elastomer matrix including:
      from 60 to 95 phr of a diene elastomer, and
      from 5 to 40 phr of a polar thermoplastic elastomer that includes an elastomer block and a polar thermoplastic block selected from a homopolymer or copolymers of an alkylacrylic acid ester, wherein the alkyl radical of the alkylacrylic acid ester includes 1 to 4 carbon atoms;
   a reinforcing filler that includes a reinforcing inorganic filler; and
   a coupling agent.

3. A tyre tread comprising a rubber composition, wherein the rubber composition includes:
   an elastomer matrix including:
      from 60 to 95 phr of a diene elastomer, and
      from 5 to 40 phr of a polar thermoplastic elastomer that includes an elastomer block and a polar thermoplastic block selected from a homopolymer or copolymers of an alkylacrylic acid ester, wherein the alkyl radical of the alkylacrylic acid ester includes 1 to 4 carbon atoms;
   a reinforcing filler that includes a reinforcing inorganic filler; and
   a coupling agent.

4. The tyre tread according to claim 3, wherein the diene elastomer of the elastomer matrix is selected from the group consisting of natural rubber, styrene copolymers, polybutadienes, and mixtures thereof.

5. The tyre tread according to claim 3, wherein the diene elastomer of the elastomer matrix includes:
   a styrene copolymer at an amount between 60% and 100% by weight of the total weight of the diene elastomer, and
   a polybutadiene, a natural rubber, or a mixture of a polybutadiene and a natural rubber at an amount between 0% and 40% by weight of the total weight of the diene elastomer.

6. The tyre tread according to claim 3, wherein the diene elastomer of the elastomer matrix includes:
   a natural rubber at an amount between 70% and 100% by weight of the total weight of the diene elastomer,
   a styrene copolymer at an amount between 0% and 30% by weight of the total weight of the diene elastomer.

7. The tyre tread according to claim 3, wherein the elastomer block of the polar thermoplastic elastomer is a diene elastomer selected from the group consisting of a butadiene-styrene copolymer and a polybutadiene.

8. The tyre tread according to claim 3, wherein the polar thermoplastic block is a polymer of methyl methacrylate or ethyl methacrylate.

9. The tyre tread according to claim 3, wherein the polar thermoplastic elastomer includes:
   20% to 60% by weight of the elastomer block, and
   21% to 42% by weight of the polar thermoplastic block.

10. The tyre tread according to claim 3, wherein the polar thermoplastic elastomer further includes another thermoplastic block.

11. The tyre tread according to claim 10, wherein the other thermoplastic block is a polymer of a vinyl aromatic compound.

12. The tyre tread according to claim 10, wherein the polar thermoplastic elastomer includes:
   20% to 60% by weight of the elastomer block,
   21% to 42% by weight of the polar thermoplastic block, and
   13% to 52% by weight of the other thermoplastic block.

13. The tyre tread according to claim 10, wherein the polar thermoplastic elastomer is a polystyrene/polybutadiene/polyethyl methacrylate copolymer or a polystyrene/polybutadiene/polymethyl methacrylate copolymer.

14. The tyre tread according to claim 3, wherein the reinforcing filler includes the reinforcing inorganic filler at an amount greater than or equal to 50% by weight.

* * * * *